US011860557B2

(12) United States Patent
Kedem et al.

(10) Patent No.: US 11,860,557 B2
(45) **Date of Patent: *Jan. 2, 2024**

(54) CLEANING SURFACES FOR PRINT APPARATUS

(71) Applicant: HEWLETT-PACKARD DEVELOPMENT COMPANY, L.P., Spring, TX (US)

(72) Inventors: Amir Kedem, Ness Ziona (IL); Michael Kokotov, Ness Ziona (IL); Elina Ploshnik, Ness Ziona (IL); Guy Nesher, Ness Ziona (IL); Alex Feygelman, Ness Ziona (IL); Eran Shiran, Ness Ziona (IL); Nadav Shalem, Ness Ziona (IL); Chen Talmor, Ness Ziona (IL)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/580,886

(22) Filed: Jan. 21, 2022

(65) Prior Publication Data

US 2022/0146964 A1 May 12, 2022

Related U.S. Application Data

(63) Continuation of application No. 16/605,822, filed as application No. PCT/US2018/023618 on Mar. 21, 2018, now Pat. No. 11,320,766.

(51) Int. Cl.

*G03G 15/16* (2006.01)
*G03G 15/08* (2006.01)
*G03G 15/11* (2006.01)

(52) U.S. Cl.

CPC ....... *G03G 15/161* (2013.01); *G03G 15/0806* (2013.01); *G03G 15/11* (2013.01); *G03G 15/162* (2013.01)

(58) Field of Classification Search

CPC ...... G03G 15/10; G03G 15/11; G03G 15/161; G03G 2215/1619; G03G 2215/1647; G03G 2215/1657

See application file for complete search history.

(56) References Cited

U.S. PATENT DOCUMENTS

| | | | |
|---|---|---|---|
| 5,220,388 | A | 6/1993 | Kato |
| 5,420,675 | A | 5/1995 | Thompson |

(Continued)

FOREIGN PATENT DOCUMENTS

| | | | |
|---|---|---|---|
| EP | 1632821 | A1 | 3/2006 |
| JP | S6250147 | A | 3/1987 |

(Continued)

*Primary Examiner* — Thomas S Giampaolo, II

(57) ABSTRACT

In an example, a print apparatus comprises an intermediate transfer member to receive thermoplastic print agent from a photoconductive surface, a rotatably mounted endless cleaning surface to receive a layer of thermoplastic print agent from the intermediate transfer member and a heater, to heat the endless cleaning surface. The endless cleaning surface may be to engage with the intermediate transfer member when heated to transfer residue from the intermediate transfer member to the layer of thermoplastic print agent on the endless cleaning surface.

16 Claims, 7 Drawing Sheets

(56) References Cited

U.S. PATENT DOCUMENTS

| | | | |
|---|---|---|---|
| 6,091,918 | A | 7/2000 | Kellie |
| 6,263,176 | B1 | 7/2001 | An et al. |
| 11,320,766 | B2 * | 5/2022 | Kedem .............. G03G 15/0806 |
| 2003/0059226 | A1 | 3/2003 | Iida |
| 2004/0234309 | A1 | 11/2004 | Nagata |
| 2008/0115681 | A1 | 5/2008 | Lee |
| 2012/0087702 | A1 | 4/2012 | McNamee |
| 2013/0045022 | A1 | 2/2013 | Zhang |
| 2014/0010567 | A1 | 1/2014 | Tabata |
| 2014/0233980 | A1 | 8/2014 | Liu |
| 2015/0205232 | A1 | 7/2015 | Phelps |
| 2017/0176892 | A1 | 6/2017 | Miyakoshi |

FOREIGN PATENT DOCUMENTS

| | | | |
|---|---|---|---|
| JP | 2000132024 | | 5/2000 |
| JP | 2008155393 | A | 7/2008 |
| WO | WO-2017178043 | A1 | 10/2017 |

* cited by examiner

CLEANING SURFACES FOR PRINT APPARATUS

BACKGROUND

Some print apparatus apply print agents such as inks or toners directly to a substrate such as paper, card, plastic metal and the like in a pattern to form an image (which may comprise any combination of text, pictures, patterns and the like) on the substrate. Other print apparatus form patterns of print agents, such as printing fluids on an image forming member and apply the formed patterns of print agents to a substrate. In some examples of so called electrophotographic printing, which may include Liquid Electrophotographic Printing (LEP), an image is first formed in toner (or in the case of LEP, electronic ink) on an electrostatic plate bearing a charge pattern corresponding to the image to be formed, the pattern is transferred to an intermediate transfer member in a first transfer, in some examples under an applied voltage, and then transferred to a substrate in a second transfer.

BRIEF DESCRIPTION OF DRAWINGS

Non-limiting examples will now be described with reference to the accompanying drawings, in which.

DETAILED DESCRIPTION

Figure 1:
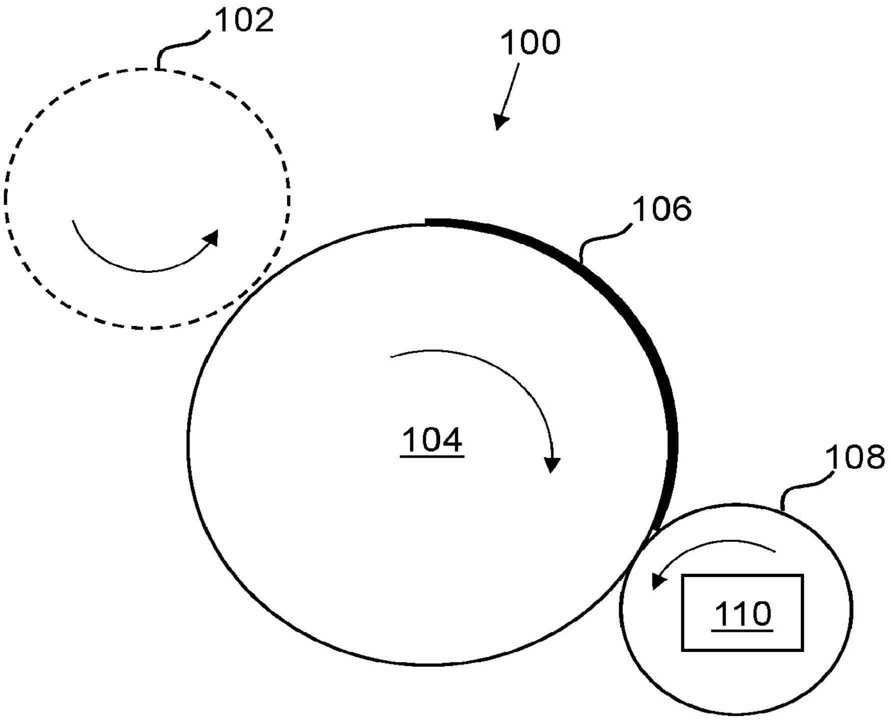
FIG. 1 is a simplified schematic diagram of an example print apparatus.

FIG. 1 shows a print apparatus 100 which may comprise, for example, at least components of a Liquid Electro Photographic (LEP) print apparatus. In a Liquid Electro Photographic (LEP) print apparatus, a pattern to be printed may first be formed as an electrostatic pattern of charges on an image forming surface (which may be curved around a cylinder). Print agent is attracted to the image forming surface according to the charge pattern to form an image.

In some examples, during a printing operation, an image may be transferred from an image forming surface to an intermediate transfer member 104. In some examples, the intermediate transfer member 104 may comprise a ‘blanket’, for example formed of rubber. In some examples, the image is transferred under a voltage. In some examples, the image may be at least partially dried or cured while on the intermediate transfer member 104. In some examples, the image may be heated while on the intermediate transfer member 104. In some examples, a number of ‘separations’, i.e. images formed of different (e.g. different color) print agents, may be built up on the intermediate transfer member 104 before being further transferred to a substrate. In other examples, separations may be transferred from the intermediate transfer member 104 to a substrate individually.

When printing, the image on the intermediate transfer member 104 may then be transferred to a substrate. This transfer may be effected by urging the substrate against the intermediate transfer member 104.

After a number of transfers have taken place from the intermediate transfer member 104 to a substrate, contaminants such as print agent residue, dust, machine oil and the like may build up on the surface of the intermediate transfer member 104 which can reduce the quality of subsequent prints.

The apparatus 100 of FIG. 1 includes an intermediate transfer member 104 which is engageable with a photoconductive surface 102 (which is shown in dotted outline for context, but which may be provided separately) to receive thermostatic print agent 106 from the photoconductive surface 102. The apparatus 100 also includes a rotatably mounted endless cleaning surface 108, which can be, for example and as shown in FIG. 1, a roller.

The endless cleaning surface 108 is engageable with the intermediate transfer member 104 to receive the thermostatic print agent 106 from the intermediate transfer member 104. In this way, in use, a layer of thermostatic print agent 106, which may be, for example, thermoplastic ink, can be applied to the endless cleaning surface 108. In some examples, the endless cleaning surface 108 may, in use of the apparatus 100, receive a plurality of layers of print agent 106.

In some examples, the print apparatus 100 also includes a heater 110 to apply heat to the endless cleaning surface 108. The heater 110 may heat the endless cleaning surface 108 to a temperature such that the thermoplastic print agent 106 acts as an adhesive. In other words, when heated, the layer of thermoplastic print agent 106 becomes ‘sticky’ and has a surface energy sufficient to remove residue from the intermediate transfer member 104 to the layer of print agent 106 on the endless cleaning surface 108.

In some examples, the heater 110 may heat the endless cleaning surface 108 to a temperature of between 70° C. and 150° C., or between 70° C. and 90° C. In some examples, the heater 110 may heat the endless cleaning surface 108 to a temperature of around 80° C.

In some examples, the temperature of the endless cleaning surface 108 is intended to be substantially the same as the temperature of the intermediate transfer member 104 (which may be in the range of 70 and 90° C., and in some examples is around 80° C.). This may reduce energy consumption and assist in maintaining a stable working temperature for the intermediate transfer member 104.

However, in some examples, the temperature of the endless cleaning surface 108 is intended to be higher than the temperature of the intermediate transfer member 104. In some examples, the temperature of the intermediate transfer member 104 may be controlled, or allowed to reduce, for example to around 30-50° C., or in some examples to around 40° C. (whereas the temperature of the endless cleaning surface 108 may still be in the range of 70 and 90° C., and in some examples is around 80° C.). This may enhance a cleaning effect.

In some examples, there may be two modes of operation: a first mode in which the temperature of the endless cleaning surface 108 is substantially the same as the temperature of the intermediate transfer member 104 and a second mode in which the temperature of the endless cleaning surface 108 is higher than the temperature of the intermediate transfer member 104. In some such examples, the first mode may be utilised throughout or during a print job and the second mode may be utilised after a print job, for example when a residue persists despite operation of the endless cleaning surface 108 at the higher temperature. This may allow 'recovery' of an intermediate transfer member 104 which has collected hard-to-clean residue without unduly impacting the temperature of the intermediate transfer member 104 during print jobs, which could otherwise in turn cause print quality issues.

In some such examples, on entering the second mode, the intermediate transfer member 104 may be allowed to cool until it reaches an intended operational temperature, at which point the cleaning surface 108 may be re-engaged with the intermediate transfer member 104.

In some examples, where the endless cleaning surface 108 is the surface of a roller, the heater 110 may be provided inside the roller. In some other examples, the heater 110 may be provided externally to the endless cleaning surface 108.

In use of the apparatus 100, when cleaning of the intermediate transfer member 104 is indicated (for example under the control of a controller of the print apparatus 100 or the like, wherein the controller may comprise one or more processors), the layer of thermoplastic print agent 106 on the cleaning surface 108 is heated and the cleaning surface 108 may be then brought into contact with the intermediate transfer member 104 such that contaminants left on the intermediate transfer member 104 by the printing process adheres to the thermoplastic print agent layer 106. Once any residue, dust or the like has been removed from the intermediate transfer member 104, the cleaning surface 108 can be disengaged from the intermediate transfer member 104 so as not to interfere with the normal printing process. In this way, the transfer of residue from the intermediate transfer member to the layer of thermoplastic print agent on the endless cleaning surface may be effected, caused or carried out. In other words, the intermediate transfer member may be cleaned of such residue.

The arrangement of the cleaning 108 enables cleaning of the intermediate transfer member 104 with negligible interruption to the printing process, without use of consumable substrates. If the cleaning surface 108 is arranged to contact the intermediate transfer member 104 after an image is transferred to a substrate, the cleaning may carried out during a print operation. In examples where multiple images are transferred to the intermediate transfer member before being transferred to a substrate, the cleaning surface 108 may be disengaged from the intermediate transfer member 104. This may enable continuous or periodic cleaning of the intermediate transfer member 104.

Furthermore, in some examples, the intermediate transfer member 104 may be cleaned outside of the standard print job for example to clean severe contamination using a relatively 'cold' intermediate transfer member 104, as set out above (i.e. when the cleaning surface 108 is hotter than the intermediate transfer member 104, which may in some examples be unheated). The cleaning system of the print apparatus 100 also has a low associated cleaning cost per page, as it uses a low amount of consumables. In particular, the system can use the print agent that is already used for the printing process to clean the intermediate transfer member, rather than any additional cleaning substances.

In some examples, an image may be printed to a substrate and a layer may be transferred to the cleaning surface 108 in a single revolution of the intermediate transfer member 104. For example, if an image occupies less than the full surface of the intermediate transfer member 104, and the amount of surface of the intermediate transfer member 104 which is not used for the image is sufficient, a layer of print agent 106 may be provided for transfer to the cleaning surface 108. In some examples, the layer 106 may span a seam portion of the intermediate transfer member 104. Such seam portions may generally be avoided when printing images as they can cause image quality issues. However, as image quality is less of a concern when providing a layer 106 to the cleaning surface 108, this portion of the intermediate transfer member 104 may be utilised (if present: some designs of intermediate transfer member 104 do not have a seam).

Figure 2:
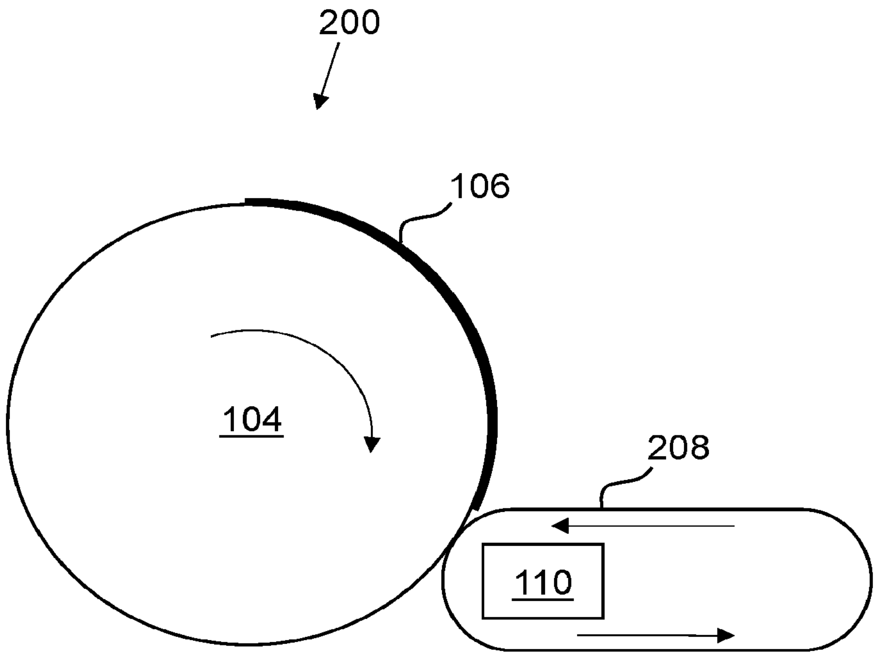
FIG. 2 is a simplified schematic diagram of another example print apparatus.

FIG. 2 shows a print apparatus 200 similar to the apparatus 100 shown in FIG. 1 (like parts have been labeled with the same reference numerals) except that in the example shown in FIG. 2, the endless cleaning surface 208 is an endless belt (i.e. a continuous loop) which is engageable with the intermediate transfer member 104. In some examples, the intermediate transfer member 104 may comprise an endless belt rather than a roller as shown.

Each of the print apparatuses 100, 200 of FIGS. 1 and 2 may be at least sub-components of Liquid Electro Photographic (LEP) printing apparatus which may be used to print a thermoplastic print agent such as an electronic ink composition. A photo charging unit may deposit a uniform static charge on the electrostatic imaging plate 102, which in some examples may be a Photo Imaging Plate, or 'PIP' of the electrostatic imaging cylinder and then a laser imaging portion of the photo charging unit may dissipate the static charges in selected portions of the image area on the PIP to leave a latent electrostatic image. The latent electrostatic image is an electrostatic charge pattern that represents the image to be printed. The electronic ink composition may then be transferred to the PIP from a print agent source, which may comprise a Binary Ink Developer (BID) unit, and which may present a uniform film of the print agent to the PIP. The print agent may be electrically charged by virtue of an appropriate potential applied to the print agent. The charged ink composition, by virtue of an appropriate potential on the electrostatic image areas, is attracted to the latent electrostatic image on the electrostatic imaging plate 102. The electrostatic imaging plate 102 then has a developed print agent/electrostatic ink composition image on its surface.

The image may be transferred from the electrostatic imaging plate 102 to the intermediate transfer member 104, in some examples by virtue of an appropriate potential and/or pressure applied between the electrostatic imaging plate 102 and the intermediate transfer member 104, such that the charged print agent is attracted to intermediate transfer member 104. The image may in some examples be dried and fused on the intermediate transfer member 104 before being transferred to the substrate/endless cleaning substrate 108 (for example, adhering thereto under pressure) depending on the operational mode.

While this process may be used both when transferring print agent to a substrate and to a cleaning surface 108, as the layer 106 to be transferred to cleaning surface 108 may be a substantially continuous area of print agent, the PIP may be left out of the transfer process. For example, the print agent may be transferred directly from a BID or other print agent source to the intermediate transfer member 104.

Figure 3:
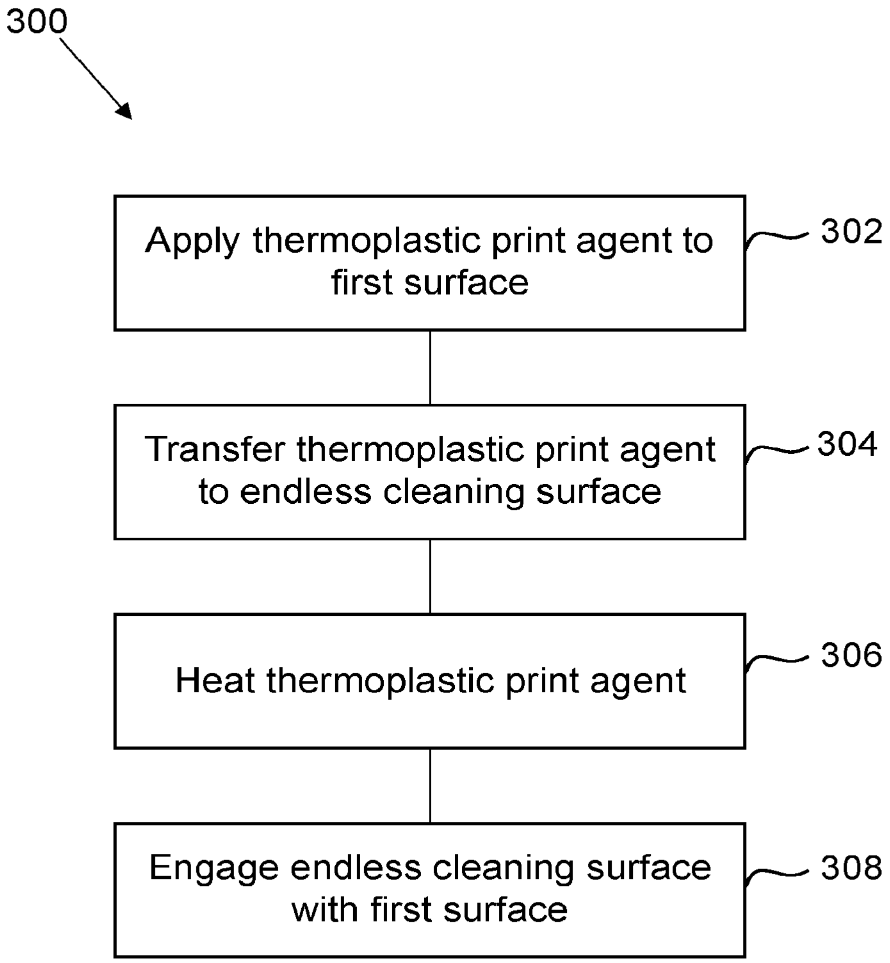
FIG. 3 is a flowchart of an example method of cleaning print agent from a surface of a print apparatus.
Figure 4:
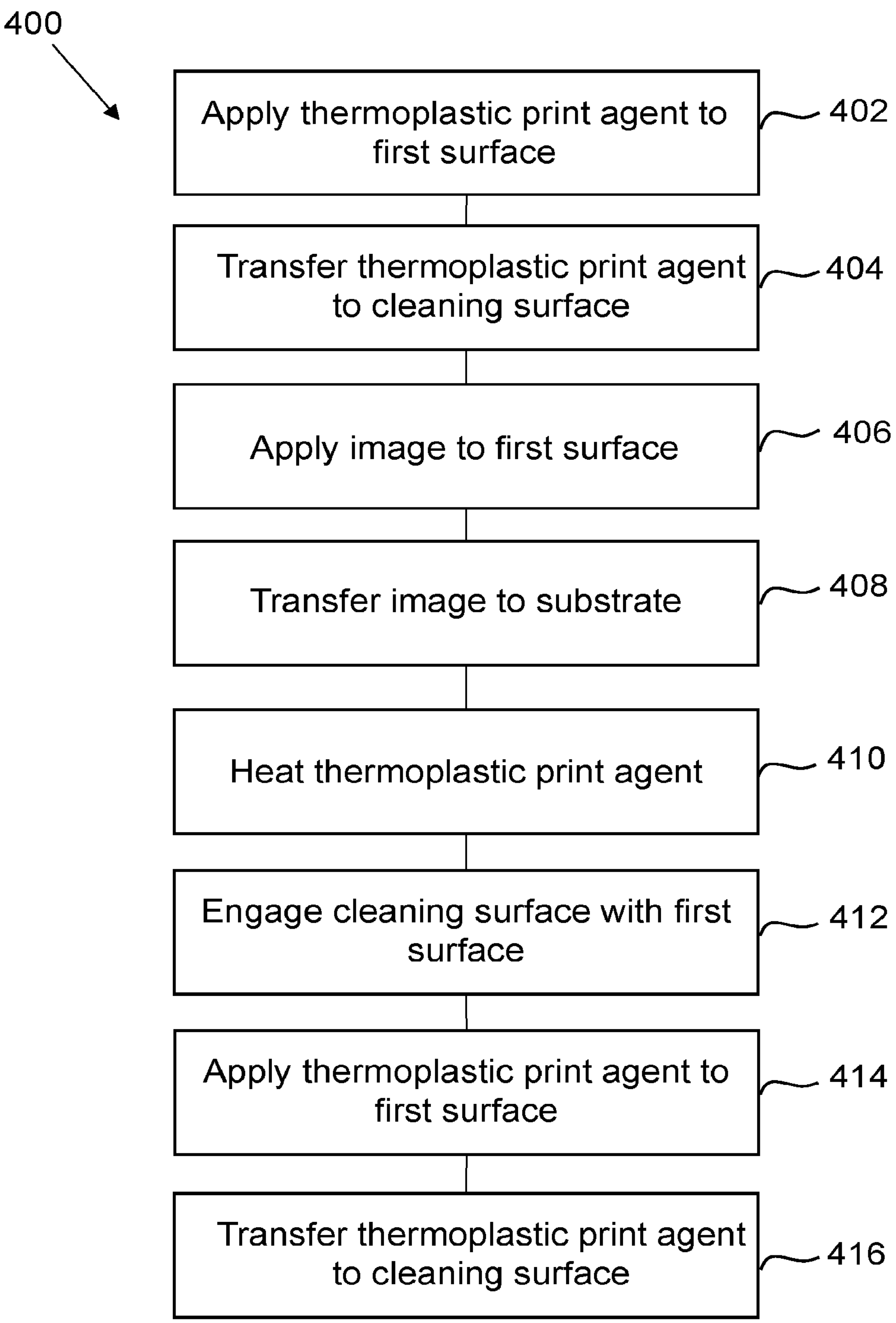
FIG. 4 is a flowchart of an example method of printing with a print apparatus.

FIG. 3 shows an example of a method 300, which may be a method for cleaning a print apparatus. In some examples, the method 300 may be carried out under the control of processing circuitry of print apparatus (e.g. a controller comprising at least one processor). The method comprises, at block 302, applying a thermoplastic print agent to a first surface of a print apparatus. The first surface may be, for example, a surface of an intermediate transfer member. In some examples, the thermoplastic print agent may be applied to the first surface by depositing the print agent on a photoconductive surface (which may be an electrostatic imaging plate as described above) and then transferring the print agent from the photoconductive surface to the first surface by engaging the photoconductive surface with the first surface.

In some examples, applying a layer of thermoplastic print agent to the first surface comprises applying a single continuous area of thermoplastic print agent to the first surface. In some examples, the thermoplastic print agent is thermoplastic ink.

Block 304 comprises transferring the layer of thermoplastic print agent to the endless cleaning surface. In some examples, this may comprise engaging the endless cleaning surface with the first surface and heating the first surface such that the thermoplastic print agent adheres to the endless cleaning surface. For example, the first surface may be heated to a temperature of between 70-100° C., in some examples, to around 80° C.

Block 306 comprises heating the layer of thermoplastic print agent on the endless cleaning surface to a temperature at which the thermoplastic print agent acts as an adhesive or becomes 'sticky'. For example, the thermoplastic print agent may be heated to a temperature between 80 and 100° C.

Block 308 comprises engaging the endless cleaning surface with the first surface of the print apparatus to transfer residue, for example print agent residue, from the first surface of the print apparatus to the heated layer of thermoplastic print agent on the endless cleaning surface, thereby cleaning residue from the first surface.

Figure 400 shows another example of a method 400 which may be a method for cleaning a print apparatus during a print operation. In some examples, the method 400 may be carried out under the control of processing circuitry of print apparatus.

Block 402 of method 400 comprises applying thermoplastic print agent to a first surface. Block 404 comprises transferring the thermoplastic print agent to an endless cleaning surface. Block 406 comprises applying an image to the first surface of the print apparatus and block 408 comprises transferring the image from the first surface to a print substrate. During transfer of the image from the first surface to the print substrate, the endless cleaning surface may be disengaged from the first surface.

Block 410 comprises heating a layer of thermoplastic print agent on the endless cleaning surface. In some examples, the layer may have been applied to the endless cleaning surface as described in relation to blocks 302 and 304. Block 412 comprises engaging the endless cleaning surface with the first surface to clean the first surface. In some examples, the endless cleaning surface may be engaged with the first surface directly after the image has been transferred to the print substrate. In some examples, where a number of separations are built up on the intermediate transfer member, the endless cleaning surface is engaged with the intermediate transfer member after a full set of separations have been transferred to the substrate.

Over time, as the thermoplastic layer captures residue and dust from the intermediate transfer member, the surface energy (and the stickiness) of the thermoplastic layer may be reduced. In some examples, thermoplastic print agent may be reapplied to the endless cleaning surface to enable the adhesive properties of the endless cleaning surface to be restored.

Block 414 of method 400 comprises applying thermoplastic print agent to the first surface. The thermoplastic print agent may be applied to the first surface in a single continuous area. At block 416, the thermoplastic print agent may be transferred to the endless cleaning surface such that a second layer of thermoplastic print agent is applied to the endless cleaning surface. This may restore the adhesive properties of the endless cleaning surface to be restored.

Figure 5:
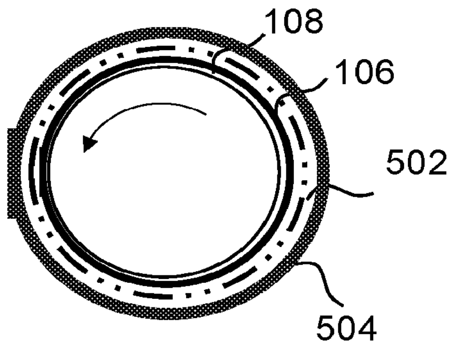
FIG. 5 is a simplified schematic diagram of another example print apparatus.

FIG. 5 shows an example in which an initial layer of thermoplastic print agent 106 has been applied to the endless cleaning surface 108. The endless cleaning surface 108 may then accumulate a layer of dirt 502 from the first surface. A further layer of thermoplastic print agent 504 has then been applied to the endless cleaning surface 108 to restore the adhesive properties of the endless cleaning surface 108.

A number of further layers of thermoplastic print agent may be built up on the endless cleaning surface 108 in this way overtime. The endless cleaning surface 108 may be periodically cleaned in order to remove the built-up of layers of thermoplastic print agent.

Figure 6:
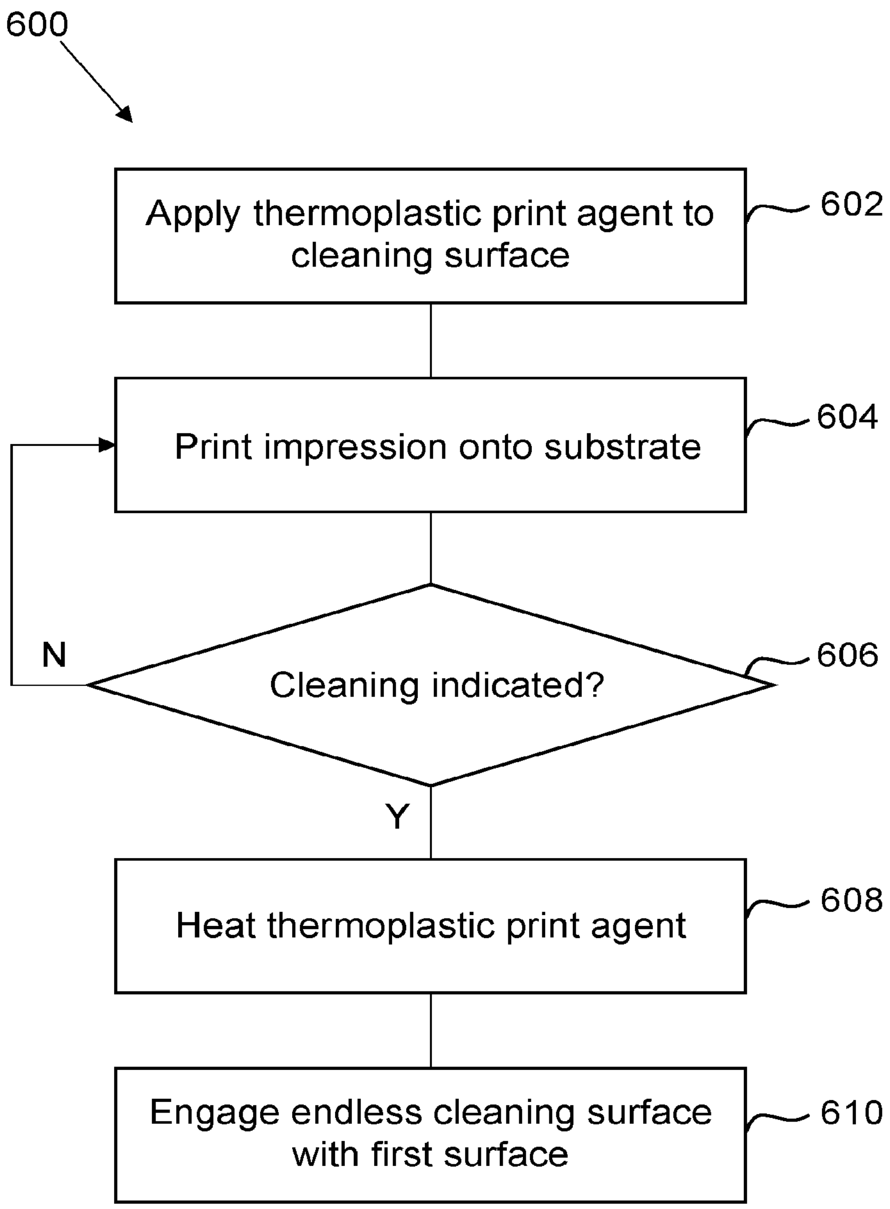
FIG. 6 is a flowchart of another example method of cleaning print agent from a surface of a print apparatus.

FIG. 6 shows a method 600, which may be a method for cleaning a print apparatus. In some examples, the method 600 may be carried out under the control of processing circuitry of print apparatus. At block 602 a layer of thermoplastic print agent, which may be thermoplastic liquid ink may be applied to a rotatable cleaning surface, which may be a rotatably mounted endless cleaning surface. Block 604 comprises printing one or more impressions onto a substrate by transferring one or more images from a photoconductive surface to the substrate via an intermediate transfer member.

Block 606 comprises determining if an indication that cleaning of the intermediate transfer member is to be carried out is present. In some examples, the indication may comprise determining that a predetermined number of print impressions has been made. The particular predetermined number may depend on the particular printing application for which the print apparatus is being used. In some examples, the indication may comprise an indication that print quality is low (e.g. below a threshold). In some examples, the indication may comprise an indication that the intermediate transfer member is dirty (or that the residue exceeds a threshold).

In response to determining that there an indication that cleaning of the intermediate transfer member is to be carried out is present, the method 600 proceeds to block 608 in which the layer of thermoplastic print agent on the rotatable cleaning surface is heated. The layer of thermoplastic print agent may be heated to a temperature at which it acts as an adhesive. In some examples the layer of thermoplastic print agent may be heated to a temperature of between 80 and 100° C.

Further, in response to determining that an indication that cleaning of the intermediate transfer member is to be carried out is present, block 610 comprises engaging the rotatable cleaning surface with the intermediate transfer member, such that residue present on the intermediate transfer member may be transferred from the intermediate transfer member to the layer of thermoplastic print agent on the rotatable cleaning surface.

If cleaning of the intermediate transfer member is not indicated at block 606, the method 600 may return to block 604 which comprises printing one or more impressions onto a substrate.

Figure 7:
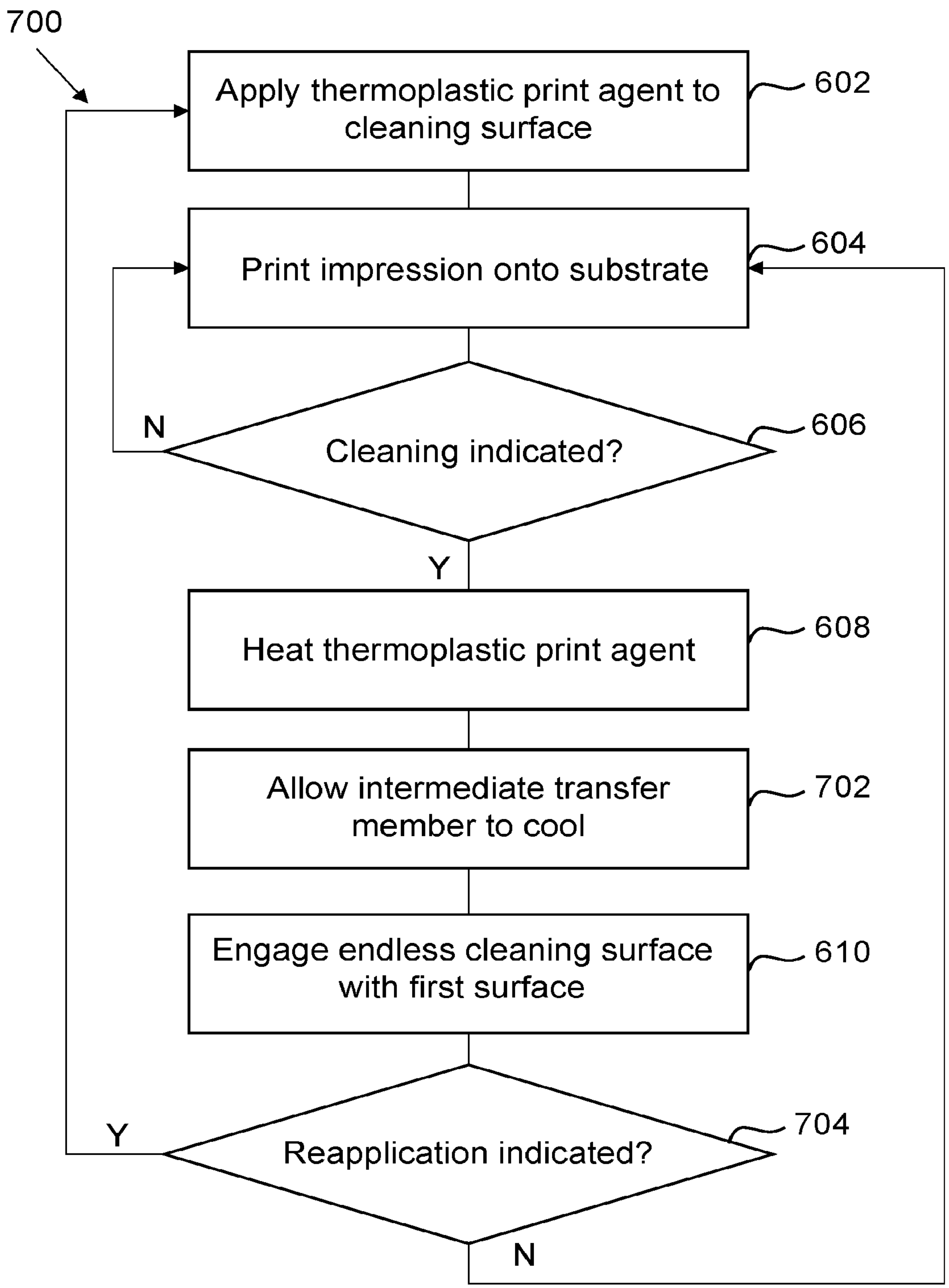
FIG. 7 is a flowchart of another example method of cleaning print agent from a surface of a print apparatus.

FIG. 7 shows a method 700, which may be a method for cleaning a print apparatus. In some examples, the method may be carried out under the control of processing circuitry of print apparatus. In addition to blocks 602 to 610 which are the same as those described in relation to method 600, method 700 also includes blocks 702 and 704.

Block 702 comprises, prior to engaging the endless cleaning surface with the first surface, allowing the intermediate transfer member to cool. This may be carried out such that intermediate transfer member is at a lower temperature than the layer of thermoplastic print agent. For example, the intermediate transfer member may be cooled/allowed to cool to around 30-50° C., or to around 40° C. This may for example follow an indication that persistent residue (e.g. residue which has persisted despite other cleaning attempts), is present on the intermediate transfer member Block 704 comprises, after engaging the rotatable cleaning surface with the intermediate transfer member, determining that a reapplication of print agent (which may be thermoplastic liquid ink) to the rotatable cleaning surface is indicated, for example by determining that there is an indication that restoration of the adhesive layer on the rotatable cleaning surface is indicated and/or that the layer has lost its stickiness. In some examples, block 704 may comprise determining that the rotatable cleaning surface has engaged with the intermediate transfer member a predetermined number of times. The particular predetermined number may depend on the particular printing application for which the print apparatus is being used.

In response to determining that reapplication of thermoplastic print agent is indicated, the method 700 returns to block 602, which comprises applying a layer of thermoplastic print agent to the rotatable cleaning surface. I.e. a second layer of thermoplastic print agent is applied to the rotatable cleaning surface. If no reapplication of print agent is indicated, the method 700 may return to block 604 which comprises printing one or more impressions onto a substrate.

The present disclosure is described with reference to flow charts. Although the flow charts described above show a specific order of execution, the order of execution may differ from that which is depicted. Blocks described in relation to one flow chart may be combined with those of another flow chart.

It shall be understood that some blocks in the flow charts can be realized using machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode. Further, some teachings herein may be implemented in the form of a computer software product, the computer software product being stored in a storage medium and comprising a plurality of instructions for making a computer device implement the methods recited in the examples of the present disclosure.

Although not shown, the print apparatus 100 may comprise additional apparatus, such as any or any combination of the photoconductive surface 102, print agent source(s) (e.g. Binary Ink Developer (BID) unit(s)), charging unit(s) to charge the photoconductive surface 102, selective charge dissipation apparatus (for example a laser imaging apparatus to dissipate charge in selective regions of a PIP), electric field units, for example to transfer a pattern of print agent from the photoconductive surface 102 to the intermediate transfer member 104, other cleaning apparatus, for example associated with the photoconductive surface 102 and/or intermediate transfer member 104, further heating and/or curing apparatus, substrate transport apparatus, and the like. The print apparatus 100 may also comprise control circuitry, for example to control the print apparatus 100 to engage and disengage the cleaning surface 108 from the intermediate transfer member 104. Such control circuitry may also control other aspects of the print apparatus, such as print operations.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfill the functions of several units recited in the claims.

The features of any dependent claim may be combined with the features of any of the independent claims or other dependent claims.

The invention claimed is:

1. A print apparatus comprising:

an intermediate transfer member to receive thermoplastic print agent from a photoconductive surface;

a rotatably mounted endless cleaning surface, to receive a layer of thermoplastic print agent from the intermediate transfer member;

control circuitry to engage and disengage the cleaning surface from the intermediate transfer member; and a heater, to heat the endless cleaning surface, wherein the endless cleaning surface is to engage with the intermediate transfer member when heated, to transfer residue from the intermediate transfer member to the layer of thermoplastic print agent on the endless cleaning surface.

2. The print apparatus according to claim 1, wherein the heater is to heat the endless cleaning surface to a temperature between 70-150° C.

3. The print apparatus according to claim 1, wherein the endless cleaning surface comprises a surface of a roller.

4. The print apparatus according to claim 3, wherein the heater is provided within the roller.

5. The print apparatus according to claim 1, wherein the endless cleaning surface comprises a belt.

6. The print apparatus of claim 1, wherein the control circuitry is configured to engage and disengage the cleaning surface from the intermediate transfer member based on whether a temperature of the intermediate transfer member is lower than a predetermined temperature.

7. A method comprising:

applying a layer of thermoplastic print agent to a first surface of a print apparatus;

transferring the layer of thermoplastic print agent from the first surface to an endless cleaning surface of the print apparatus;

applying an image of a print job to the first surface of the print apparatus and, with the image on the first surface, applying an additional layer of print agent to another portion of the first surface;

transferring the image from the first surface to a substrate and the additional layer of print agent to the endless cleaning surface;

heating the layer of thermoplastic print agent on the endless cleaning surface to a temperature at which the thermoplastic print agent acts as an adhesive; and engaging the endless cleaning surface with the first surface of the print apparatus to transfer residue from the first surface of the print apparatus to the heated layer of thermoplastic print agent on the endless cleaning surface.

8. The method according to claim 7, wherein applying a layer of thermoplastic print agent to the first surface comprises applying a continuous area of print agent to the first surface of sufficient size to later clean the first surface when transferred to the endless cleaning surface.

9. A method according to claim 7, further comprising:

heating the layer of print agent on the cleaning surface to a first temperature matching a temperature of the first surface during a print job; and heating the layer of print agent on the cleaning surface to a second temperature, higher than the first temperature after completion of the print job.

10. The method according to claim 7, wherein the first surface is a surface of an intermediate transfer layer, the method further comprising applying a fresh layer of print agent from the intermediate transfer member to the endless cleaning surface in response to a determination that a current layer of print agent on the endless cleaning agent has reduced ability to transfer the residue from the intermediate transfer member.

11. The method according to claim 7, further comprising, prior to engaging the endless cleaning surface with the first surface, allowing the first surface to cool such that it is at a lower temperature than the rotatable cleaning surface.

12. A method comprising:

apart from forming an image of a print job, applying a layer of thermoplastic print agent to a cleaning surface by applying the print agent to an intermediate transfer member and transferring the print agent from the intermediate transfer member to the cleaning surface;

determining that cleaning of the intermediate transfer member is to be carried out, and in response:

heating the print agent on the cleaning surface; and engaging the cleaning surface with the intermediate transfer member to adhere residue on the intermediate transfer member to the print agent on the cleaning surface.

13. A method according to claim 12, wherein determining that cleaning of the intermediate transfer member is to be carried out comprises determining that a predetermined number of print impressions has been made.

14. A method according to claim 12, further comprising, after engaging the cleaning surface with the intermediate transfer member, determining that a reapplication of thermoplastic print agent to the cleaning surface is indicated, and in response, applying a further layer of thermoplastic print agent to the cleaning surface.

15. A method according to 14, wherein determining that a reapplication of thermoplastic print agent to the cleaning surface is indicated comprises determining that the cleaning surface has engaged with the intermediate transfer member a predetermined number of times.

16. The method according to claim 12, further comprising applying the print agent on the intermediate transfer member spanning a seam portion of the intermediate transfer member.

* * * * *